(12) United States Patent
Schepperle et al.

(10) Patent No.: US 7,806,013 B2
(45) Date of Patent: Oct. 5, 2010

(54) REGULATING DEVICE FOR A REGULATING OR CONTROL ELEMENT

(75) Inventors: Bernd Schepperle, Constance (DE); Eckhardt Lübke, Friedrichshafen (DE); Karl-Hermann Ketteler, Markdorf (DE); Andreas Fuessl, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 666 days.

(21) Appl. No.: 11/663,121

(22) PCT Filed: Jul. 27, 2005

(86) PCT No.: PCT/EP2005/008131

§ 371 (c)(1),
(2), (4) Date: Oct. 5, 2007

(87) PCT Pub. No.: WO2006/029671

PCT Pub. Date: Mar. 23, 2006

(65) Prior Publication Data

US 2008/0134821 A1    Jun. 12, 2008

(30) Foreign Application Priority Data

Sep. 18, 2004  (DE) .................. 10 2004 045 432

(51) Int. Cl.
*F16H 59/00*  (2006.01)
*F16H 61/00*  (2006.01)
*F16H 63/00*  (2006.01)

(52) U.S. Cl. .......................... 74/335; 74/337

(58) Field of Classification Search ............ 74/335, 74/336 R, 337, 337.5
See application file for complete search history.

(56) References Cited

U.S. PATENT DOCUMENTS

| | | | | |
|---|---|---|---|---|
| 3,683,247 | A * | 8/1972 | Reimers et al. | 318/45 |
| 5,199,325 | A * | 4/1993 | Reuter et al. | 74/335 |
| 5,337,848 | A * | 8/1994 | Bader | 180/65.25 |
| 6,047,799 | A |  4/2000 | Ahnert et al. | |
| 6,230,576 | B1 | 5/2001 | Yamada et al. | |
| 7,014,587 | B2 | 3/2006 | Grundl et al. | |
| 7,211,025 | B2 * | 5/2007 | Fujioka | 477/8 |
| 2006/0055273 | A1 * | 3/2006 | Lasa Berasategui et al. | 310/211 |

FOREIGN PATENT DOCUMENTS

| | | |
|---|---|---|
| DE | 197 49 681 A1 | 5/1998 |
| DE | 101 13 300 A1 | 10/2002 |
| DE | 102 22 339 A1 | 11/2002 |
| DE | 102 10 198 A1 | 9/2003 |
| EP | 1 257 040 A2 | 11/2002 |

* cited by examiner

*Primary Examiner*—Tisha D Lewis
(74) *Attorney, Agent, or Firm*—Davis & Bujold, P.L.L.C.

(57) ABSTRACT

The invention relates to a regulating mechanism for operating an actuator or connecting element (11, 12) of an automatic transmission. The regulating mechanism has an actuator (3), a regulating mechanism (4), a transmission element (6), and an output element (8, 9). According to the present invention, the actuator (3) is configured as a three phase motor, advantageously as an asynchronous motor. The torque (M) of the actuator (3) is converted into an actuating force (S) in the transmission element (6), which is then applied to a regulated and or connecting element (11, 12).

4 Claims, 3 Drawing Sheets

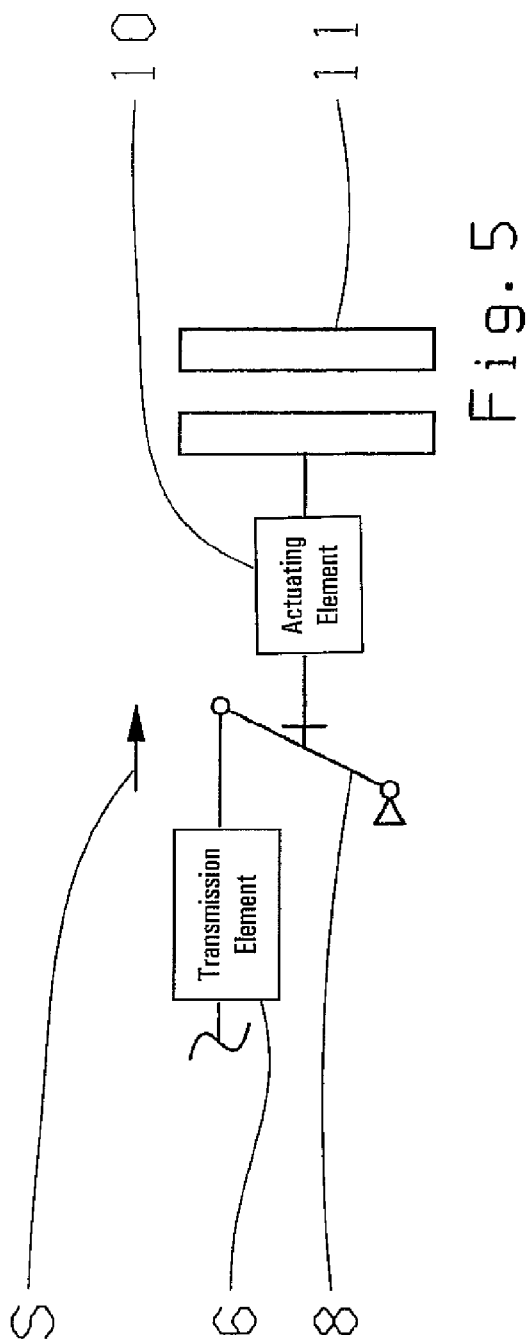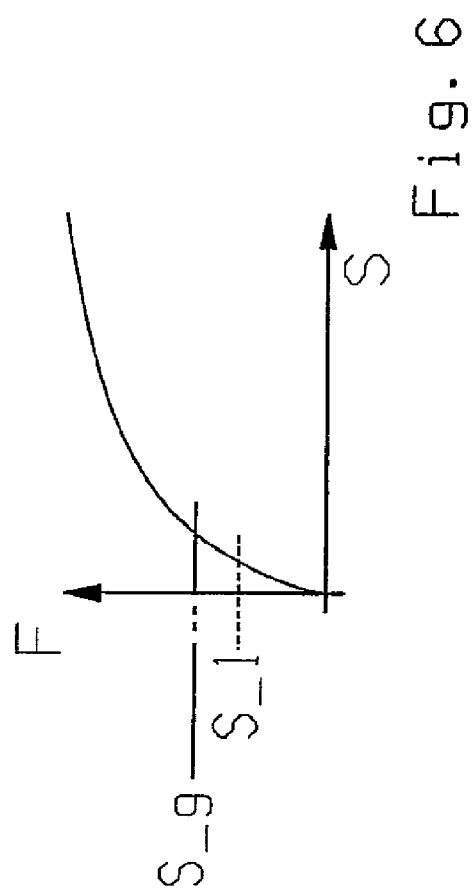

REGULATING DEVICE FOR A REGULATING OR CONTROL ELEMENT

This application is a national stage completion of PCT/EP2005/008131 filed Jul. 27, 2005, which claims priority from German Application Serial No. 10 2004 045 432.9 filed Sep. 18, 2004.

FIELD OF THE INVENTION

The present invention relates to a regulating device for operating a regulating or control element of an automated vehicle transmission, as well as a process for operating a regulating device.

BACKGROUND OF THE INVENTION

Regulating devices for operating control elements in automated transmissions usually have one actuator, one output element and one transmission element by which torque, produced by the actuator, is converted into an actuating force. DC motors are usually used as actuators, in DC motors, a magnetic field produced by a stator generates a flow of current in the electrified conductor of a rotor. The current is usually transmitted to the rotor by the stator, via carbon brushes. That is why such motors are also called brush motors.

DE 102 22 339 A1 discloses this type of arrangement for operating a clutch. A DC motor drives an output element that produces the axial movement of a piston via a ball screw. This makes control of engaging and disengaging a clutch possible. The DC motor is assisted by an energy storage unit when the clutch is disengaged.

DC motors have a speed-torque characteristic with a linear gradient. At high rotational speed that would allow rapid movement, the maximum torque drops. Furthermore, the torque curve of such motors is temperature-dependent. When the temperature increases, the resistance in the windings rises, magnetization by the permanent magnets drops and the current transmitted to the rotor decreases with consequent decline in torque. Particularly when the clutch is actuated, the poorly cooled rotor with the armature windings, where the losses occur, is an additional disadvantage of the brush motor. Due to the losses occurring when used for operating control elements, an energy storage unit is usually necessary in order to relieve the brush motor of the actuating function.

Depending on the construction, DC motors have rotors with a plurality of windings. There is a direct relationship between the number of windings and the maximum torque of a DC motor. In order to achieve a certain torque, DC motors require a minimum rotor diameter that is dependent on the type of construction. The moment of inertia increases as the $4^{th}$ power of the distance from the center of gravity of the rotor to its axis of rotation, which leads to DC motors having a relatively high moment of inertia. When the mass moment of inertia has to be reduced, the rotor diameter must also be reduced, which leads to a reduction in the efficiency of the motor. Hence, the energy storage unit, described above, also serves the purpose of relieving the electrical system of the vehicle, which is necessary due to the low efficiency of the brush motor.

The brush system of DC motors also has a limited lifetime. Particularly when used in commercial vehicles, sufficient lifetime for brush motors is not always ensured. Also, taking the lifetime of the brush system into account, only a limited brake torque of the actuator can be developed. This leads to longer actuating times.

The task of the present invention is to provide a regulating device for an actuator or control element that is robust, can be adequately cooled and has a high degree of efficiency. In addition, the regulating device should enable a high actuation speed. In order to achieve high speeds, the availability of a high acceleration torque, high rotational speed and high deceleration torque are of decisive importance. In addition, a low mass moment of inertia in the drive motor is a requirement as well.

SUMMARY OF THE INVENTION

According to the present invention, a regulating mechanism is proposed, which enables operation of a connecting element of an automated transmission with an actuator, an output element and a transmission element, by way of which torque produced by the actuator is converted into an actuating force. In addition, the regulating mechanism is combined with a control element for controlling the actuator and the actuator is configured as a three-phase motor. Thereby, both synchronous and asynchronous motors can be used.

In a three-phase motor, a rotating field is developed in the stator windings, which creates an induced voltage in the rotor of an asynchronous motor or an interaction with the magnetic field of the rotor of a synchronous motor.

In an asynchronous motor, the rotor or armature can be particularly advantageously configured as a cage rotor. Here, instead of a plurality of windings, the rotor has only individual profile rods, which can consist of copper, bronze or aluminum, for example. This is possible because the rotor in asynchronous motors is "only" in charge of producing a strong induction current. The cause of the induction is a relative speed between the rotating field and the rotor, which means that the rotational speed of the motor is always smaller than the rotational speed of the rotating field. The embodiment with the cage rotor is particularly robust and unsusceptible to contamination. Thus, an asynchronous motor can also be advantageously arranged inside an oil compartment. As the oil can flow through the gap between the rotor and the stator, this kind of motor can be cooled particularly well.

In synchronous motors, the rotor field must not be first generated by induction, as the rotor as such is configured as a magnet. The armature of the synchronous motor moves through the rotating field of the stator without rotational speed difference.

In order to quickly achieve the necessary torque, high acceleration is important. It is, therefore, advantageous for the torque of the actuator to be kept as constant as possible above the rotational speed. In three-phase motors, it is possible to keep a constant torque above the rotation speed to a large extent by using control devices.

In three-phase motors, the insulated winding is part of the stator. The rotor is either a permanent magnet or has a basic, non-insulated winding. For this reason, depending on the type of rotors the rotor diameter can be made smaller than in DC motors. Thus, depending on the type of design, the mass moment of inertia is smaller, which also has a positive effect on maximum acceleration.

The greatest proportion of power loss in three-phase motors originates in the stator, which is advantageously located externally. In this position, the stator can be adequately cooled, for example by using cooling fins or thermal contact with other components. By contrast, most losses in conventional DC motors occur in the rotors, which are located inside the stator and can only be poorly cooled. In three-phase motors, the temperature can also be compensated for via the controller. Thus, the effect of temperature on the motor torque can be eliminated. If an asynchronous motor is used as an actuator, it can even be arranged inside an oil compartment, where cooling can be further improved. Asynchronous motors are much more sensitive to dirt than DC motors with brushes. In an asynchronous motor, it is possible to have a cooling liquid flowing between the rotor and the stator.

On the whole, three-phase motors have a satisfactory degree of efficiency and only put slight strain on the electrical system of the vehicle. The DC in the electrical system of the vehicle is first converted into three-phase current by the power inverter and it is only there that the reactive current originates, i.e., outside the electrical system of the vehicle. In DC motors, the maximum torque is achieved when the armature comes to a standstill. In that state, the nominal voltage of the motor must contact the brushes, where direct load is applied to the electrical system of the vehicle and the motor absorbs high losses. In addition, the winding resistance of three-phase motors is considerably lower. Consequently, in a three-phase motor, there is significantly less loss with the same torque than in a DC motor. The maximum torque can also be retained longer due to the smaller power loss. Significantly less strain is put on the electrical system of the vehicle.

With the use of known regulating mechanisms with a DC motor to operate a connecting element, such as a clutch or a brake, force compensation is necessary. The force compensation assists the DC motor when disengaging or engaging the connecting element. For example, the dynamics of this type of regulating mechanisms is strengthened by a pre-stressed spring. At the same time, certain aspects of force compensation also require travel compensation. Travel compensation compensates for deviations caused by tolerance and wear inside the regulating mechanism, also ensuring that the zero point for engaging and disengaging the connecting element is not displaced.

Due to the advantageous features of three-phase motors, sufficient actuating force for the regulating and control procedure can be generated in the output element without force compensation, which can be dispensed with. Without force compensation, travel compensation is no longer necessary. Therefore, with an application of the regulating mechanism, according to the present invention, many components and a complicated structure can be dispensed with.

With the regulating mechanism, tolerance and wear in connecting elements can directly be compensated for. In order to make this possible, the actuator creates a torque that produces a small actuating force. This actuating force is below the threshold value that must be created as a minimum to engage or disengage the connecting element. A smaller actuating force is then applied to the actuating element, but the connecting element is not affected functionally. This application of force on the actuating element compensates for tolerance or wear in the operating direction of the connecting element. This could, for example, be compensation for wear on the clutch disk. This ensures that the entire necessary regulating distance for engaging or disengaging the connecting element is always available and is not used to compensate for tolerance.

The actuating element usually has at least one anti-Friction bearing. Putting strain on the actuating element advantageously results in less strain being put on the rolling elements of the bearing. In this way, strain is put on the rolling elements in such a way that they glide freely in the bearing ring. If they were not subjected to strain, they would remain in a certain position and the revolving bearing ring would grind against the rolling elements. By putting strain on the bearing, wear on the rolling element is reduced.

BRIEF DESCRIPTION OF THE DRAWINGS

The invention will now be described, by way of example, with reference to the accompanying drawings in which:

FIG. 5 is a conceptual drawing of a loading condition, and

FIG. 6 is a diagram of the necessary actuating force.

DETAILED DESCRIPTION OF THE INVENTION

Figure 1:
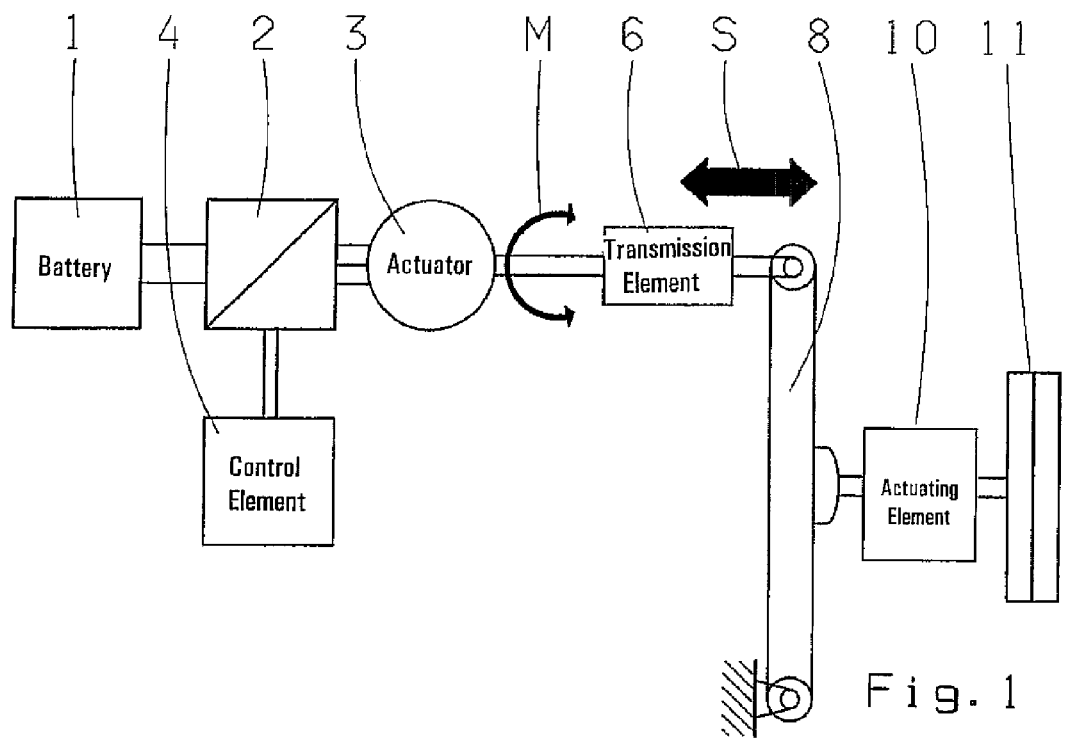
FIG. 1 is a schematic diagram of the regulating mechanism according to the present invention for operating a connecting element.

FIG. 1 shows the schematic construction of a regulating mechanism, according to the present invention, for a coupling operation. A battery 1 supplies an inverter 2 with DC. From this DC, the inverter 2 produces alternating current. The inverter 2 is actuated by a control device 4 and relays the alternating current to an actuator 3. The actuator 3 is driven by the alternating current and produces an output torque M. This torque M is converted directly into an actuating force S by a mechanical transmission element 6. Via the transmission element 6, the actuating force S is applied to an output element 8. The output element 8 then acts upon an actuating element 10, which transmits the actuating force to a connecting element 11. The connecting element 11 can, for example, be a clutch or a brake.

Figure 2:
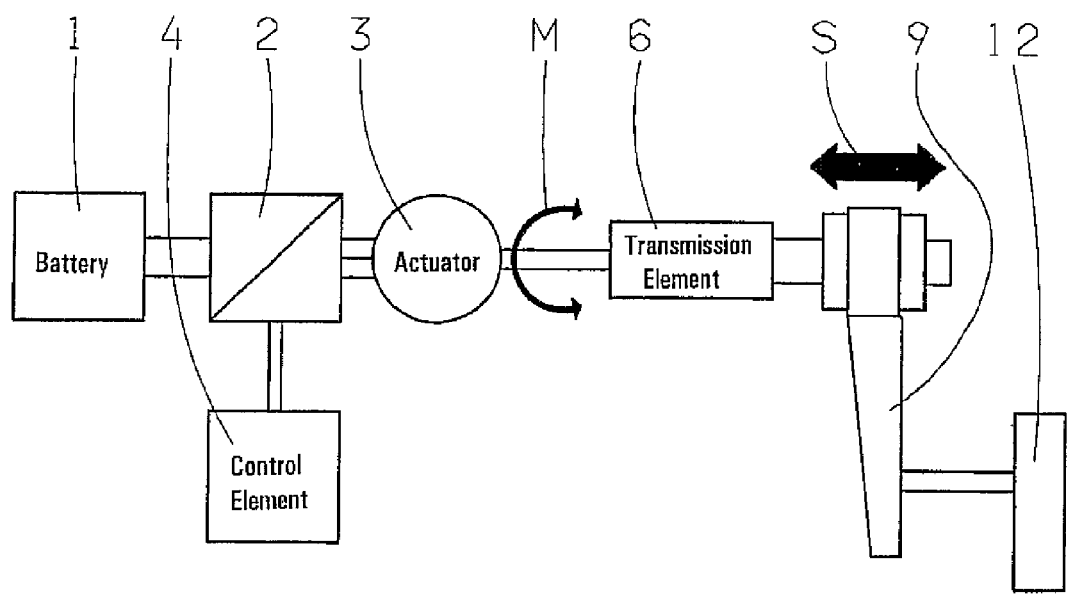
FIG. 2 is an additional schematic diagram of a regulating mechanism, according to the present invention, for actuating a regulating mechanism.

FIG. 2 shows a schematic construction of a regulating mechanism for a shifting function. The same numerals as in FIG. 1 indicate the same components. The axial force S is transmitted to an output element 9, for example a gear change lever or shift-fork. The gear change lever or shift-fork 9 then selects a gear in a motor vehicle transmission, for example, via a regulating mechanism 12. This could correspond to a gearshift sleeve in a claw-shifted motor vehicle transmission.

Figure 3:
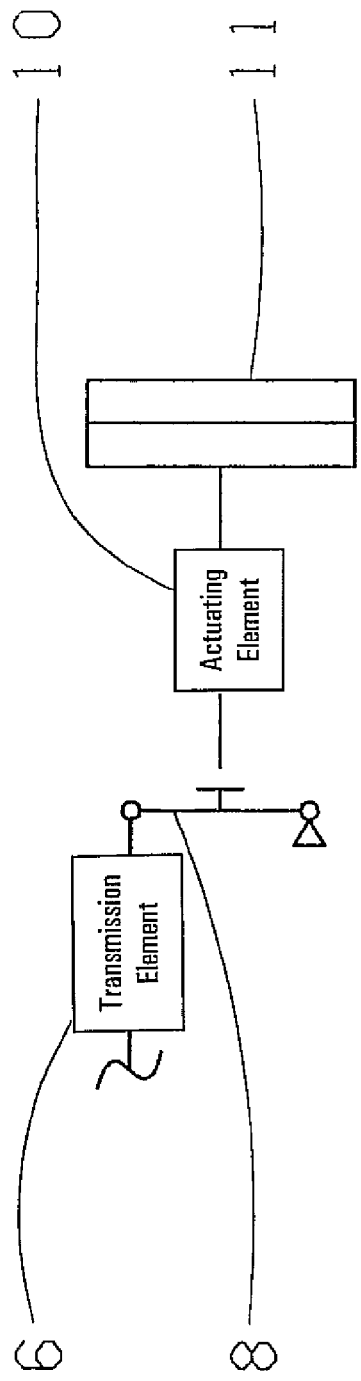
FIG. 3 is a conceptual drawing of a loading condition.

FIG. 3 shows the transmission element 6 with the output element 8, the actuating element 10 and the connecting element 11. The image shows the assembly of a regulating mechanism for a dry starting clutch. Here, no actuating force S is transmitted from the transmission element 6 to the output element 8. Thus, there is no power transmission between the output element 8 and the actuating element 10 yet.

Figure 4:
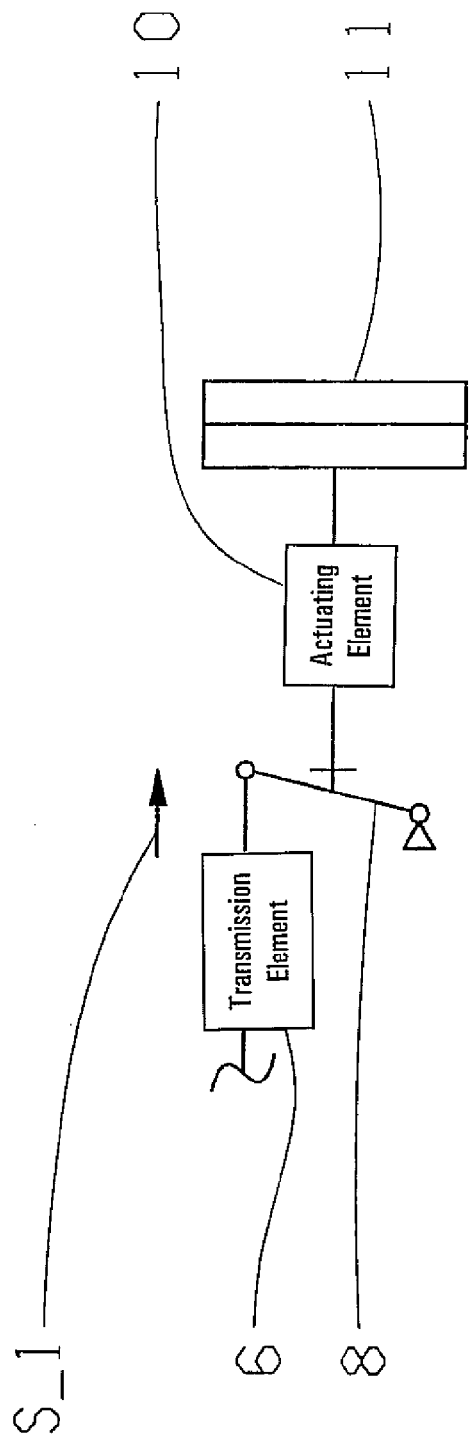
FIG. 4 is a conceptual drawing of a loading condition.

FIG. 4 shows a regulating mechanism, corresponding to FIG. 3, where an actuating force S_1 is transmitted from the transmission element to the output element 8. The actuating force S_1 is thereby smaller than a limit actuating force S_g that is necessary to engage or disengage the connecting element 11. Strain is thus put on the actuating element 10, but the function of the connecting element 11 is still not affected. According to the present invention, this state can last throughout the operation of the vehicle. Because of this strain, tolerance and wear can be compensated on the one hand and, on the other hand, the bearings of the actuating element 10, for example, as a release bearing, will be put under strain. In this way, wear-free movement of the disengagement bearing can be guaranteed.

FIG. 5 shows a regulating mechanism, corresponding to FIG. 3, where the actuating force S acts on the output element 8 and is greater than the limit actuating force S_g, the minimum force that is required to engage or disengage a connecting element 11. Only then is the connecting element 11 actuated.

FIG. 6 shows a progression F of the required actuating force S for operating the connecting element 11 over the range of control. The first actuating force S_1 represents an actuating force S, which puts strain on the actuating element 10, but does not yet have any effect on the function of the connecting element 11. The value of the limit actuating force S_g indicates the value of the minimum actuating force S that must be available for the connecting element 11 to be engaged or disengaged.

REFERENCE NUMERALS 1 battery
2 inverter
3 actuator
4 control device
6 transmission element
8 output element
9 output element
10 actuating element
11 connecting element
12 regulating mechanism
F progression
M torque
S actuating force
S_1 actuating force
S_g limit actuating force

The invention claimed is:

1. A method of operating a regulating mechanism to actuate a connecting element (11) of an automated transmission of a motor vehicle by an actuator (3), a control element (4), a transmission element (6) and an output element (8, 9), the actuator (3) being a three phase motor, the method comprising the steps of:
controlling the actuator (3), via an inverter (2), with the control element (4);
converting, via the actuator (3), electrical energy into a torque (M);
converting the torque (M), via the transmission element (6), into an actuating force (S_1) that is less than a limit actuating force (S_g), which is a minimum amount of force required for actuating the connecting element (11); and
transferring the actuating force (S_1) that is less than the limit actuating force (S_g), via the output element (8, 9), to an actuating element (10) connected to the connecting element (11).

2. The method of operating a regulating mechanism according to claim 1, further comprising the step of:
converting the torque (M) into an actuating force (S) greater than the limit actuating force (S_g); and
using one of a clutch and a brake as the connecting element (11) such that the actuating force (S) greater than the limit actuating force (S_g) applied, via the output element (8) and the actuating element (10), one of engages and disengages one of the clutch and the brake.

3. A method of operating a regulating mechanism to actuate a connecting element (11) of an automated transmission of a motor vehicle by an actuator (3), a control element (4), a transmission element (6) and an output element (8, 9), the actuator (3) being a three phase motor, the method comprising the steps of:
controlling the actuator (3), via an inverter (2), with the control element (4);
converting, via the actuator (3), electrical energy into a torque (M);
converting the torque (M), via the transmission element (6), into an actuating force (S_1) that is less than a limit actuating force (S_g), which is a minimum amount of force required for actuating the connecting element (11);
transferring the actuating force (S_1) that is less than the limit actuating force (S_g), via the output element (8, 9), to an actuating element (10) connected to the connecting element (11);
converting the torque (M) outputted from the actuator (3) into an actuating force (S) greater than the limit actuating force (S_g); and
using one of a clutch and a brake as the connecting element (11) such that the actuating force (S) greater than the limit actuating force (S_g) applied, via the output element (8) and the actuating element (10), one of engages and disengages one of the clutch and the brake; and
continuously providing the actuating force (S_1) that is less than the limit actuating force (S_g).

4. A method of operating a regulating mechanism to actuate a connecting element (11) of an automated transmission of a motor vehicle by an actuator (3), a control element (4), a transmission element (6) and an output element (8, 9), the actuator (3) being a three phase motor, the method comprising the steps of:
controlling the actuator (3), via an inverter (2), with the control element (4);
converting, via the actuator (3), electrical energy into a torque (M);
converting the torque (M), via the transmission element (6), into an actuating force (S_1) that is less than a limit actuating force (S_g), which is a minimum amount of force required for actuating the connecting element (11);
transferring the actuating force (S_1) that is less than the limit actuating force (S_g), via the output element (8, 9), to an actuating element (10) connected to the connecting element (11);
converting, via the transmission element, the torque (M) into an actuating force (S) that is greater than the limit actuating force (S_g); and
actuating with the actuating force (S) that is greater than the limit actuating force (S_g), via the output element (8, 9), at least one of an actuating element (10) and the connecting element (11).

* * * * *